United States Patent
Wu et al.

(10) Patent No.: US 8,000,043 B2
(45) Date of Patent: Aug. 16, 2011

(54) LENS MODULE WITH ZOOM AND AUTO-FOCUS FUNCTIONS

(75) Inventors: Yung-Teng Wu, Taipei Hsien (TW); Ta-Hsaing Chao, Taipei Hsien (TW); Shang-Yi Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 472 days.

(21) Appl. No.: 12/239,733

(22) Filed: Sep. 26, 2008

(65) Prior Publication Data

US 2009/0256948 A1 Oct. 15, 2009

(30) Foreign Application Priority Data

Apr. 9, 2008 (CN) .......................... 2008 1 0300930

(51) Int. Cl.
*G02B 7/02* (2006.01)
(52) U.S. Cl. ...................................... 359/824
(58) Field of Classification Search .................. 359/694, 359/696, 821–824; 348/376
See application file for complete search history.

(56) References Cited

U.S. PATENT DOCUMENTS

| 6,067,421 A * | 5/2000 | Kitazawa et al. ............ 396/133 |
| 2007/0120442 A1 | 5/2007 | Piotr et al. |

* cited by examiner

*Primary Examiner* — Joseph P Martinez
(74) *Attorney, Agent, or Firm* — Zhigang Ma

(57) ABSTRACT

A lens module includes a case, one and more lens units positioned in the case and having at least one lens, a carrying member, a piezoelectric driving unit, and at least a fixing member. The carrying member is connected to the lens unit such that the lens unit is movable forward and backward. The piezoelectric driving unit is mounted in the case for transferring a driving force to the carrying member so as to carry the lens unit to move. By using this configuration, the front and rear lens units may conduct the auto focus function and the zoom function respectively, thereby reducing a stroke of the lens, and reducing the size of the lens driving unit. Accordingly, the lens module may be manufactured in a small size so that it may be inserted into a cellular phone.

10 Claims, 2 Drawing Sheets

LENS MODULE WITH ZOOM AND
AUTO-FOCUS FUNCTIONS

BACKGROUND

1. Technical Field

The present invention relates to a lens module and, more particularly, to a compact lens module with zoom and auto-focus functions.

2. Description of Related Art

In general, miniaturization of lens modules is a challenging task, especially for those with zoom and auto-focus functions due to technological complexities involved therein. As a result, large-size drivers, reduction gears and lens direction guiding structure are often required and employed to realize the zoom and auto-focus functions.

It is desired, therefore, to provide a lens module which can overcome the above-mentioned problem.

BRIEF DESCRIPTION OF THE DRAWINGS

The present invention is described in detail hereinafter, by way of example and description of preferred and exemplary embodiments thereof and with references to the accompanying drawings, in which.

DETAILED DESCRIPTION OF EXEMPLARY EMBODIMENTS

A detailed explanation of a lens module according to an exemplary embodiment will now be made with references to the drawings.

Figure 1:
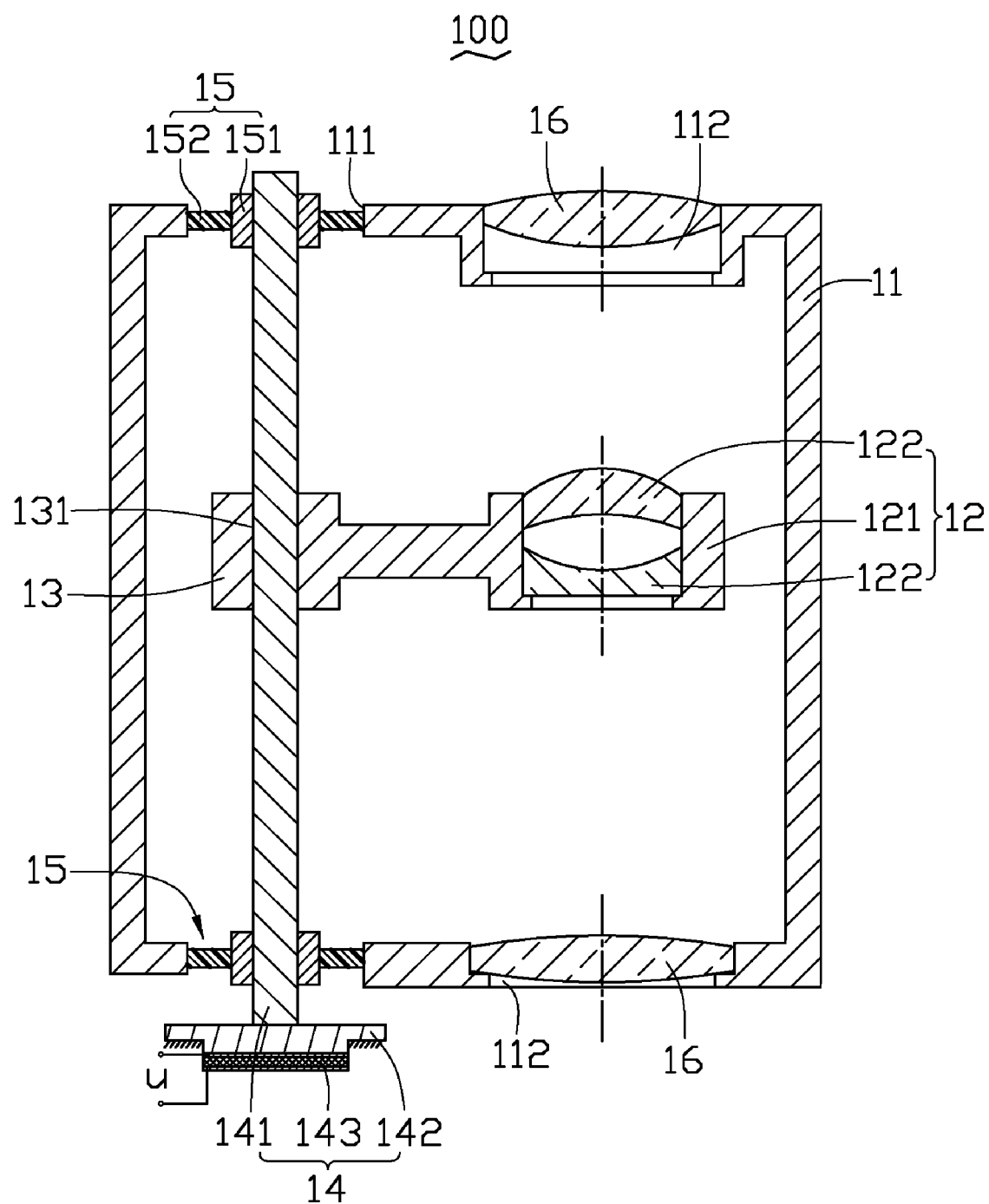
FIG. 1 shows a cross-sectional view of a lens module in accordance with an embodiment.

Referring to FIG. 1, a lens module 100 according to an embodiment of the present invention is shown. The lens module 100 includes a case 11, a lens unit 12 positioned in the case 11, a carrying member 13, a piezoelectric driving unit 14, and two fixing members 15. The carrying member 13 is connected to the lens unit 12. The piezoelectric driving unit 14 has a driving shaft 141 slidably connected to the carrying member 13.

The case 11 may be a lens barrel having a bottom and a top. The case 11 is used for receiving various optical elements, such as the lens unit 12, shutters, apertures, and the piezoelectric driving unit 14, among other elements. The case 11 defines two receiving openings 111 for fixing the fixing member 15 on the bottom or top thereof. Two lens openings 112 are respectively defined on the bottom and top of the case 11 for passage of light beams to form an image by an image capturing module (not shown), such as CCD, CMOS, etc.

The lens unit 12 includes a lens housing 121 and two lenses 122 received in the lens housing 121. The lens housing 121 defines a lens opening 123 therein in which the lens 122 is mounted and is made of a light material such as a resin for the purpose of a small and light structure of the lens module 100. The lens 122 may be a convex lens, a concave lens, or a mixture thereof. In the present embodiment, the lens module 100 still includes two other lens 16 respectively fixed in the lens openings 112 of the case 11 along a common optical axis of the lens module 100 for providing the zoom function thereof. Understandably, when only one lens unit 12 has been mounted in the lens module 100, the auto focus function may be performed. The lens unit 12 is spaced apart from other lens units 16 therebetween.

The carrying member 13 is connected to the outer side of the lens housing 121 so that the lens unit 12 may be driven to move forward or backward along the common optical axis. Optionally, the carrying member 13 can be integrally formed with the lens housing 121. The carrying member 13 defines a hole 131 in another end thereof for passage of the driving shaft 14.

The piezoelectric driving unit 14 still includes an elastic body 142 connected to the driving shaft 141, and a piezoelectric substrate 143 attached to a surface facing away from the driving shaft 141. The driving shaft 141 may have a rectangular or cylindrical shape cross-sectionally, but the shape of the driving shaft 141 is not limited to those cases. In addition, the driving shaft 141 can be either a solid or hollow metal rod. The elastic body 142 is fixed at a camera housing (not shown) and is made of an elastic member having a predetermined thickness. In the present invention, phosphor bronze is used as the material constituting the elastic body 142. The piezoelectric substrate 143 has two electrodes provided on each of both surface thereof and generates vibration when an input pulse is applied thereto. When an electric field is applied to the piezoelectric substrate 143, bending vibration of elastic body 142 attached to the piezoelectric substrate 143 is transmitted to the driving shaft 141. As a result, the carrying member 13 linearly moves so as to drive the lens unit 12 to move backward and forward. Here, the principle of moving the carrying member 13 is based on the law of inertia. The driving shaft 141 is fixed in the case 11 via the fixing member 15 in parallel with the common optical axis of the lens module 100.

The fixing member 15 is received in the receiving opening 111 of the case 11 and includes a contacting portion 151 and an elastic portion 152 connected to the contacting portion 151 and the case 11. In the present embodiment, the lens module 100 has two fixing members 15 disposed on the bottom and top of the case 11. The contacting portion 151 is a hollow cylinder for passage of the driving shaft 141 and is fixed to the driving shaft 141. It is appreciated that the contacting portion 151 is made of rigid material. The elastic portion 152 is made of elastic material, such as elastic resin, rubber, or the like. The elastic portion 152 has an annular shape. It is appreciated that the thickness of the contacting portion 151 is larger than that of the elastic portion 152. The inner side of the elastic portion 152 is connected to the contacting portion 151, and the outer side is fixed in the wall of the receiving opening 111. In the present embodiment, the elastic portion 152 is a leaf spring.

Figure 2:
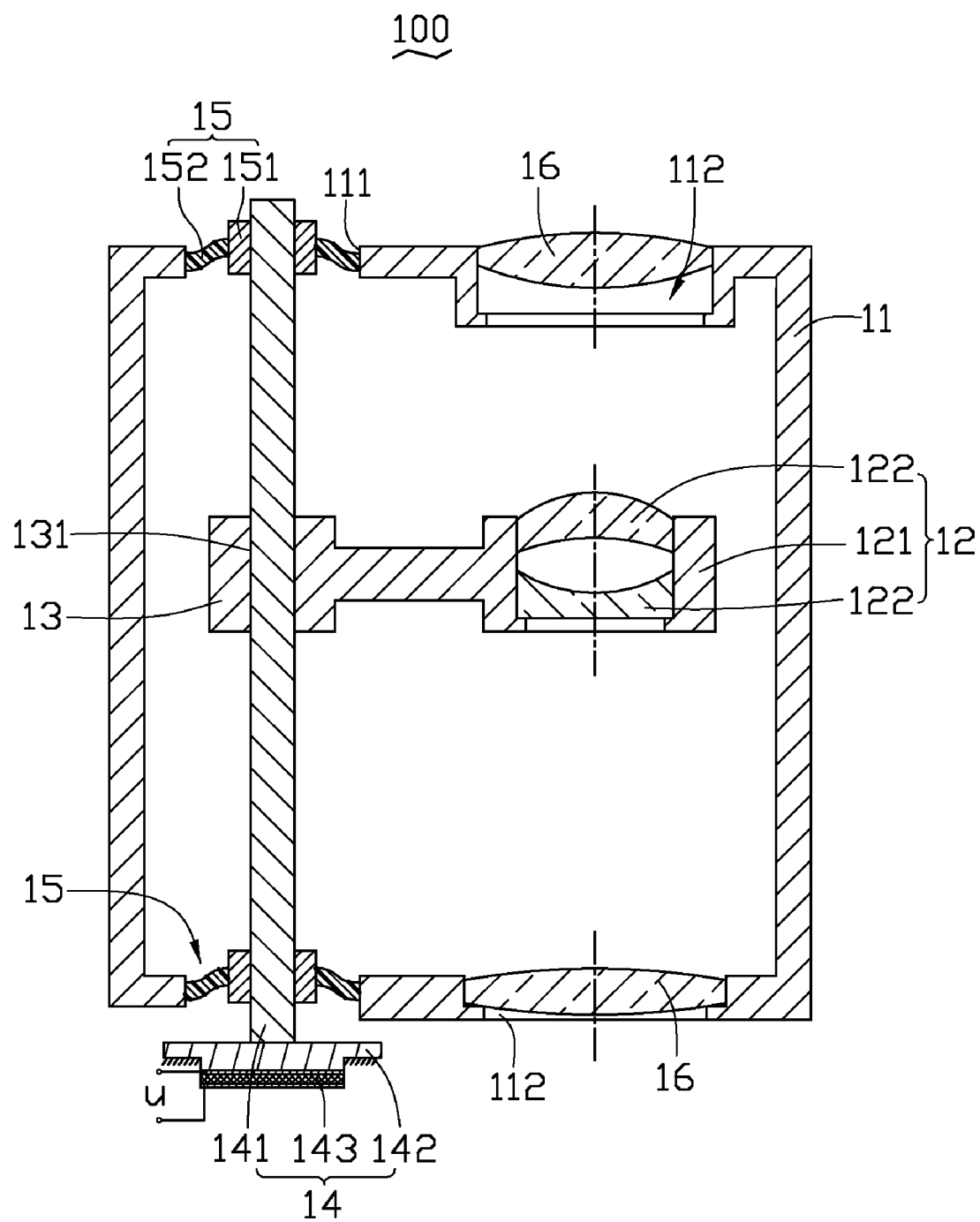
FIG. 2 is another cross-sectional view of the lens module of the embodiment, showing the lens module in use.

Referring to FIG. 2, in use, as an input pulse is continuously applied, the piezoelectric driving unit 14 gradually generates supersonic frequency vibration on the elastic body 142, and the carrying member 13 becomes moved by means of a friction force caused by the contact with the driving shaft 141. When the driving shaft 141 moves forward and backward under the driving force provided by the supersonic frequency vibration, the fixing member 15 can locate the driving shaft 141 and move forward and backward, which allow the lens unit 12 to move along the common optical axis.

The embodiment provides a lens module 100 which uses a lens unit 12 to perform the auto focus function or the zoom function, arranges the piezoelectric driving unit 14 so that the lens unit 12 may move independently, and is capable of controlling movement stroke by adjusting voltage frequency. By using this configuration, the front and rear lens unit 12 may conduct the auto focus function and the zoom function respectively, thereby reducing a stroke of the lens and reducing the size of the lens driving unit 12. Accordingly, the lens module 100 may be manufactured in a small size so that it may be inserted into a cellular phone.

It should be understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A lens module, comprising:
a case;
at least one lens unit positioned in the case and having at least one lens;
a carrying member connected to the at least one lens unit;
a piezoelectric driving unit comprising a driving shaft mounted in the case and the driving shaft passing a hole defined by the carrying member, the driving shaft being configured for transferring a driving force to the carrying member so as to carry the lens unit to move forward and backward; and
at least one fixing member configured for fixing the driving shaft to the case and comprising a contacting portion contacting the driving shaft and an elastic portion connected to the contacting portion and the case.

2. The lens module as claimed in claim 1, wherein the piezoelectric driving unit further comprises a linear piezoelectric motor to provide the driving force.

3. The lens module as claimed in claim 1, wherein the thickness of the contacting portion is larger than that of the elastic portion.

4. The lens module as claimed in claim 1, wherein the contacting portion defines a hollow for passage of the driving shaft and to fix the contacting portion to the driving shaft.

5. The lens module as claimed in claim 1, wherein the contacting portion is made of rigid material.

6. The lens module as claimed in claim 1, wherein the elastic portion comprises a leaf spring.

7. The lens module as claimed in claim 1, wherein the at least fixing member comprises two fixing members, the carrying member is positioned between the two fixing members.

8. The lens module as claimed in claim 1, wherein the case comprises a lens barrel, the at least one lens unit is arranged in the lens barrel.

9. The lens module as claimed in claim 1, wherein the piezoelectric driving unit comprises an elastic body connected to the driving shaft and a piezoelectric substrate attached to a surface of the elastic body facing away from the driving shaft.

10. The lens module as claimed in claim 1, wherein the case defines at least a receiving opening for fixing the fixing member, the elastic portion is made of elastic material and has an annular shape, the inner side of the elastic portion is connected to the contacting portion, and the outer side of the elastic portion is fixed in the wall of the receiving opening.

* * * * *